United States Patent Office 3,198,655
Patented Aug. 3, 1965

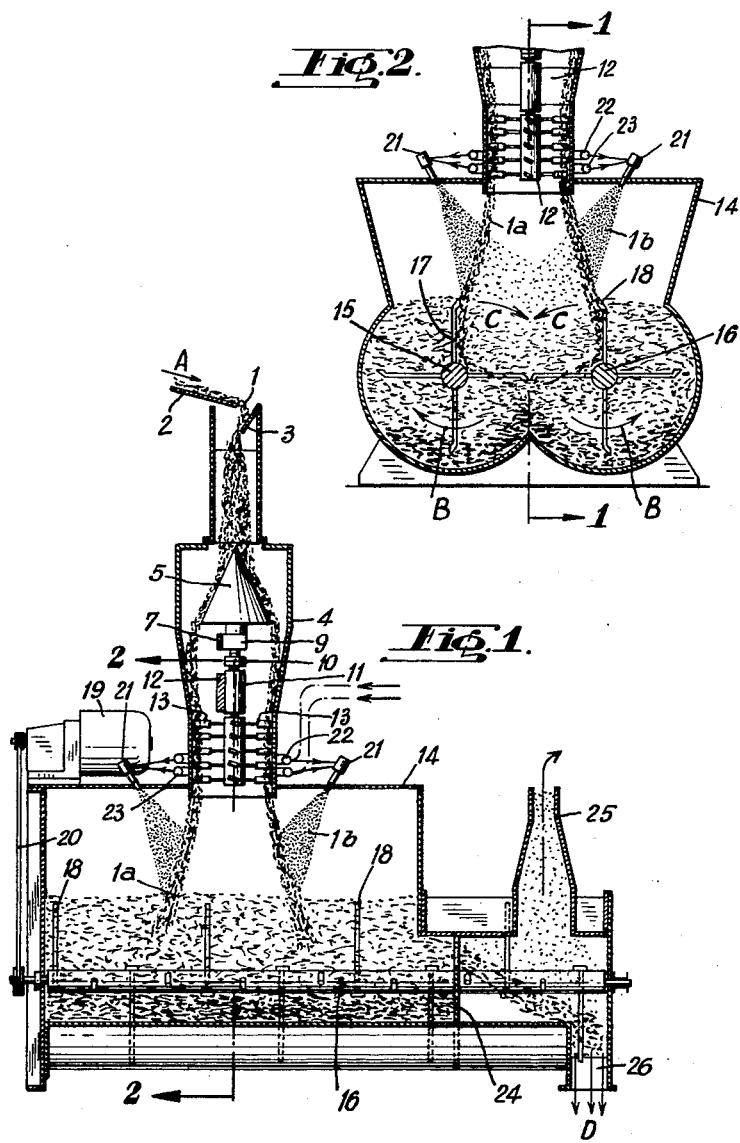

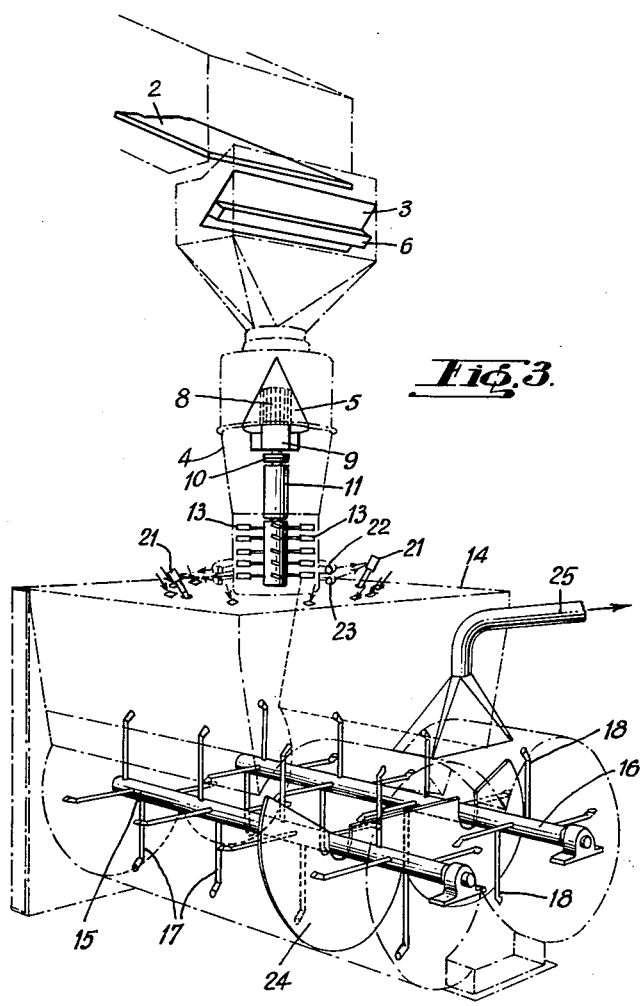

3,198,655
METHOD AND APPARATUS FOR COATING LOOSE PARTICLES WITH A SPRAYABLE BONDING SUBSTANCE
Kurt Gisiger, Zurich, Switzerland, assignor to Fred Fahrni, Zurich, Switzerland
Filed Nov. 15, 1960, Ser. No. 69,386
Claims priority, application Switzerland, Nov. 18, 1959, 811,216, 639,197
11 Claims. (Cl. 117—100)

The object of the present invention is a method for coating loose particles with a sprayable bonding substance, which is sprayed onto the surface of the particles falling in measured quantities in the form of a veil of particles.

The basic problem of the invention, which up to the present has found no satisfactory solution, is to spray a predetermined quantity of bonding substance as evenly as possible onto a quantity of particles of predetermined volume or weight whilst avoiding as much as possible the soiling of fixed or moving machine parts.

These exigencies, resulting from practical experience, are now, as tests have shown, very nearly satisfied by the method according to the invention. According to the invention the new method consists in imparting to the particles a supplementary acceleration in the downward direction.

Owing to this acceleration of the particles to be coated with the bonding substance—the veil of particles is extended at the same time—they do not remain as long within active reach of the spraying nozzles. This makes it possible, the output remaining the same, i.e., the quantity of particles coated with bonding substance per unit of time remaining the same, to choose a thickness of the veil of particles which is reduced in proportion to the increase of the speed with which the particles fall. The probability that the particles falling past the spraying nozzles mutually cover one another is considerably reduced owing to this extension of the veil of particles, and the result is a more even distribution of the sprayed bonding substance. In the known methods, on the other hand, the particles falling too close past the nozzles take up too much and the more distant particles take up too little bonding substance.

The acceleration of the particles could also be merely used to increase the capacity of an installation for coating with bonding substance. The described advantage of a better distribution of the bonding substance would then however be lost. The acceleration of the particles is appropriately chosen in such a manner that in spite of an increase in the quantity of particles coated with bonding substance per unit of time, a sufficient extension of the veil of particles occurs. This results in an additional very desirable effect: The greater flow of particles allows nozzles with larger orifices to be used. Such nozzles are less liable to choke than those with very fine orifices. The reliable more uniform operation of the nozzles also contributes to approaching closer to the ideal distribution of the bonding substance.

It has been found advantageous to give to the veil of particles a symmetrical rotational shape and to spray the bonding substance onto this veil sideways from the outside. Particularly good results are obtained when the particles receive not only a supplementary vertical speed, but a tangential component of motion as well. This can be achieved in a simple manner by means of inclined blades rotating within a hollow cylinder. Owing to the centrifugal force on the one hand, and to the air resistance on the other the larger particles tend to move to the outside of the hollow practically conically shaped veil of particles, and the result of this is that the larger particles take up a larger percentage of the bonding substance than the smaller particles. In addition, the turbulence imparts to the particles an additional desirable individual motion.

When the acceleration of the particles, the depth of the veil of particles and the density of the distribution within the latter are suitably chosen, part of the bonding substance will pass through the veil of particles. This is particularly desirable when one wishes to cause the bonding substance passing through a greater or lesser part of the veil of particles to strike the opposite inner face of the veil in order to increase the uniformity of the distribution still further.

The invention concerns in addition a device for carrying out the new method, which comprises means for delivering measured quantities of the particles to be coated with bonding substance, a distributing device following this means which has a point of delivery for forming the veil of particles, and in addition means for the acceleration of the particles issuing from the point of delivery and forming the veil.

In the following the method and the device will be described by way of examples with reference to the drawing. The case is that of the coating of wood shavings, chips, etc., such as those extensively used for instance for pressing wood-shaving boards by means of heated multiple presses.

FIGURE 1 illustrates a longitudinal section through the device along the line 1—1 in FIGURE 2.

FIGURE 2 shows a cross-section along the line 2—2 in FIGURE 1, and

FIGURE 3 shows a perspective view of the device illustrated in FIGS. 1 and 2, certain parts of the casing being only schematically indicated, in order that the various components of the machine may be clearly seen.

In the case of a device for coating with a bonding substance of the above-mentioned kind, it is important that the particles should be fed in exactly measured quantities, in order that an even veil of particles may be obtained. This measurement can be effected with regard to the weight or to the volume of the particles. In the present embodiment a vibration feed trough 2 is provided for the purpose, which can for instance cooperate with a spike drum (which is not shown) which serves to retain the particles lying above a given level. The particles, indicated by the cipher 1, move in the direction of the arrow A and strike a baffle plate 3 from which they fall onto the distributing cone 5 arranged in a flow funnel 4. A magnet 6 arranged on the under side of the baffle 3 for the elimination of eventual iron particles may be seen in FIG. 3. The distributing cone 5 is mounted in the flow funnel 4 by means of a flat iron profile 7, so that the flow of particles is practically undisturbed. In addition, it serves to carry an electric motor 8 which drives the rotation and accelerating members described below. A reduction gear 9 reduces the speed of rotation to the desired value. The reduction gear 9 is followed by a clutch 10, the other side of which is connected to a shaft rotating in a bearing 11. This bearing is mounted in the same way as the reduction gear 7 by means of a flat iron profile 12. A number of blades 13 mounted on the lower end of this shaft impart a circular motion to the particles flowing down from above, and at the same time, owing to the setting of the blades and to the peripheral speed, strongly accelerate the particles, owing to which the initially still thick veil is superficially extended to a veil of particles 1a having a considerably greater speed.

The flow funnel 4 together with the components mounted within it projects into the inner space of a casing 14, which serves as the trough of a discharging device to be described later on which at the same time subjects the shavings which have been sprayed to a thorough mixing before the goods leave the machine.

Spraying nozzles 21 are evenly distributed around the circular ring-shaped delivery point of the flow funnel 4 and are fed through circular ducts 22 and 23 with a liquid bonding substance, for instance a solution or emulsion of bonding substance, and in addition, compressed air. The compressed air provides an air jet to supplement or supplant the blades 13 in accelerating the speed of the particles. Obviously, separate air jets could be provided either next to nozzles 21 or blades 13. A further circular duct for the hardening or similar fluid could naturally also be provided. Such a separate feed is advantageous when the mixing of the various components must be effected immediately before the coating operation. The spray nozzles 21 project obliquely into the casing 14 and spray the finely atomized bonding substance 1b against the particles falling in an inclined direction under the influence of gravity and of the centrifugal force. A small part of the bonding substance passes through the veil of particles.

The discharge device consists of a double-trough transporter each having a shaft 15, respectively 16 and correspondingly formed impelling arms 17, respectively 18. An electric motor 19 and a V-belt 20 serve to drive the shafts 15 and 16. The directions of rotation of the arms 17 and 18 are indicated by the arrows B. The arrows C indicate how the already practically coated material is stirred around during its travel towards the outlet. The immediate discharge from the machine of the mixture of shavings, respectively particles, and bonding substance is purposely avoided, owing to the fact that there is always a small part of the sprayed bonding substance remaining in the form of mist which has not entirely settled on the particles. It has been found advantageous to subdivide the discharge device, and to exhaust air, through outlet 25, from the second chamber thus formed, which practically constitutes an air lock. Contrarily to former proposals, the air containing the mist of bonding substance is not exhausted laterally over the shortest way, which gives a very weak filtering effect, but is drawn axially in direction of the outlet through the whole moving stream of shavings. The separation of the air from the coated particles is then effected in the second chamber, at the end of the discharge device. A damming bulkhead between the two chambers ensures that the air which is being drawn off flows as far as possible through the upper part of the particles or shavings which are being moved forward, in order that as little as possible of the spray mist comes into contact with the impeller arms or shafts.

The coated material is discharged by means of the last impeller arm through an opening 26 provided in the bottom of the discharge device (arrows R) and which has a smaller section than the passage between the first and the second chamber. In this manner the amount of unwanted air drawn in through the discharge opening is substantially reduced.

The greater part of the air flowing through the coated particles or shavings is thus drawn off from the first chamber. By giving the openings in the cover plate through which the nozzle heads pass the appropriate dimensions, the amount of air introduced is just that required to direct the bonding substance mist which is still free towards and through the shavings or particles. In this manner the fouling of the walls by the settling of particles of bonding substance and dust, which is usually so much feared, is largely prevented.

Advantageously, warm air may even be introduced through the said air openings, in order to favour the rapid drying of the drops of bonding substance on the particles, shavings or similar particles, which still further reduces the rubbing off of bonding substance on the walls or impelling members of the discharge device. Such a rubbing off or mutual rubbing of the coated particles against one another is then unnecessary, or even undesirable, when the distribution of bonding substance has already been effected beforehand in the most efficient manner which is possible. Every unnecessary rubbing against one another of the particles only favours the formation of new undesirable dust, and can even be most unwished for, in cases where very fine and thin shaving particles should be made to retain their initial shape as far as possible.

The position of the nozzles 21 can have a not inconsiderable effect on the quality of the coating operation. By choosing a larger angle between the geometric axis of the flow funnel, respectively of the bladed shaft rotating therein on the one hand and the geometric axis of the nozzles on the other, the particles of bonding substance penetrating the veil of particles 1a can be caused to strike the opposite inner side of the curtain either partially or totally. This can result in a greater regularity of the distribution of the bonding substance according to the kind of particle, the density of the distribution and similar factors.

It has been shown that wood-shaving boards hot-pressed from shavings coated with bonding substance according to the invention possess better mechanical properties than boards made from shavings coated with bonding substance according to methods formerly habitually in use. In addition, the consumption of bonding substance is less.

What I claim is:

1. A method for thoroughly coating small solid particles comprising the steps of supplying a quantity of small particles to a distributing device and subjecting the small particles to the force of gravity, imparting a rotating and spreading direction to the downwardly falling particles, causing each individual particle to follow the path of a helix and causing the group of particles to form a wide hollow cylindrical configuration, subjecting said particles directly, in addition to the forces of gravity, to a positive acting supplemental accelerating force in order to increase the velocity of the falling particles in a downward direction with respect to normal free falling velocity in air, and subjecting said particles to a spray of bonding material.

2. The method of claim 1 and forming the veil of small particles in the configuration of a rotational hollow cylindrical body, passing said particles by auxiliary means for imparting not only an accelerating speed in a downward direction, but also in a circular direction, and spraying said bonding substance substantially sideways from the outside toward and through the veil of particles.

3. The method of claim 2 comprising using wood particles for particle board construction material and passing said veil of sprayed particles into a trough, stirring and moving said wood particles in a horizontal direction through the trough, and discharging said particles from the particle outlet end of said trough.

4. The method of claim 3 and drawing by suction at the outlet exhaust, air and bonding substance mist through the particles in the horizontal trough.

5. The method of claim 2 and extending and spreading out said particles so that open spaces occur therebetween, and passing said bonding substance to the adjacent particles and also through the open spaces in the rotating, downwardly directed particles so that all sides of said particles are thoroughly coated.

6. The method for coating small particles of a solid material with sprayable bonding substance comprising the steps of forming a veil of particles, permitting said particles to fall freely under the influence of gravity for a predetermined distance, applying a positive downwardly directed accelerating force to said particles as said particles pass a predetermined point in their fall by gravity in order to thin out the quantity of said particles in a given area and space said particles from each other, passing said spaced and thinned-out particles through a binder spraying zone whereby each particle in the veil of particles will receive the desired share of binder on its outer surface, and that portion of the binder substance which passes through the veil strikes the opposite inner side of the veil.

7. An apparatus for coating loose particles of a solid material with a sprayable bonding substance, means for delivering measured quantities of the particles to be coated with bonding substance, a distributing device which has a circular point of delivery for forming a veil of particles, and spray nozzles are arranged below the distributing device, and means for accelerating the falling particles of the veil in order to impart greater velocity to them with respect to normal free falling velocity in air, said distributing device comprising a vertical hollow cylindrically shaped flow funnel which delivers the particles and in which are disposed a distributing cone and, below this cone, a rotatably mounted axis having several slanted fan blades capable of imparting a circular motion to the air and particles flowing down and, in addition, accelerating the particles and surrounding air vertically.

8. The apparatus of claim 7, characterized in that said flow funnel opens into the upper part of the casing of a discharge trough fitted with impeller members which have a horizontal rotating axis.

9. An apparatus for coating small particles of wood with a sprayable bonding substance, means for delivering measured quantities of the wood particles to be coated with bonding substance, a rotating distributing device to impart a circular motion to said wood particles and form them into a free falling veil of particles moving in a helical downward path, and spray nozzles arranged below the distributing device, and means for accelerating the falling wood particles of the veil in order to impart greater velocity to them with respect to normal free falling velocity in air whereby the spray from said spray nozzles will coat the one side of the adjacent particles and the opposite side of the same particles after passing through said veil.

10. An apparatus as set forth in claim 9, said wood particles being wood chips for pressing into a particle board construction panel, and said rotating distributing device being in the shape of an upwardly directed pointed cone, the length of said cone being such as to give to the contacting sliding wood particles a substantial rotational direction and form a spread-out, expanded hollow cylindrical veil of wood particles with air spaces therebetween whereby each wood particle will be completely coated on all sides by the bonding substance sprayed from the spray nozzles.

11. An apparatus as set forth in claim 9 comprising a horizontal trough into which said veil of wood particles falls, and means for stirring said wood particles and moving them horizontally, and a discharge outlet for releasing said coated and stirred wood particles.

References Cited by the Examiner
UNITED STATES PATENTS

| | | | |
|---|---|---|---|
| 2,071,846 | 2/37 | Lamb et al. | 118—303 |
| 2,601,355 | 6/52 | Wyss et al. | 118—303 |
| 2,625,305 | 1/53 | Conkling | 259—8 X |
| 2,707,690 | 5/55 | Pearson | 117—105.5 |
| 2,707,847 | 5/55 | Anliker | 118—303 |
| 2,871,575 | 2/59 | Dupont | 259—7 |
| 2,953,359 | 9/60 | Mau | 118—303 |

WILLIAM D. MARTIN, *Primary Examiner.*

RICHARD D. NEVIUS, *Examiner.*